No. 772,157. PATENTED OCT. 11, 1904.
H. W. KOEHLER.
RATCHET LEVER.
APPLICATION FILED JAN. 15, 1904.
NO MODEL.

WITNESSES:
H. Walker
Isaac B. Owens

INVENTOR
Henry W. Koehler
BY
ATTORNEYS

No. 772,157.　　　　　　　　　　　　　　　　　Patented October 11, 1904.

UNITED STATES PATENT OFFICE.

HENRY WILLIAM KOEHLER, OF OSWEGO, OREGON.

RATCHET-LEVER.

SPECIFICATION forming part of Letters Patent No. 772,157, dated October 11, 1904.

Application filed January 15, 1904. Serial No. 189,141. (No model.)

*To all whom it may concern:*

Be it known that I, HENRY WILLIAM KOEHLER, a citizen of the United States, and a resident of Oswego, in the county of Clackamas and State of Oregon, have invented a new and Improved Ratchet-Lever, of which the following is a full, clear, and exact description.

The invention relates to novel features of construction and arrangement residing in a ratchet-lever and ratchet, by means of which a suitable leverage may be exerted on the ratchet, and the dog or pawl must automatically disengage the ratchet upon the reverse movement of the lever.

This specification is an exact description of one embodiment of my invention, while the claim defines the actual scope thereof.

Reference is to be had to the accompanying drawings, forming a part of this specification, in which similar characters of reference indicate corresponding parts in all the views.

Figure 1:
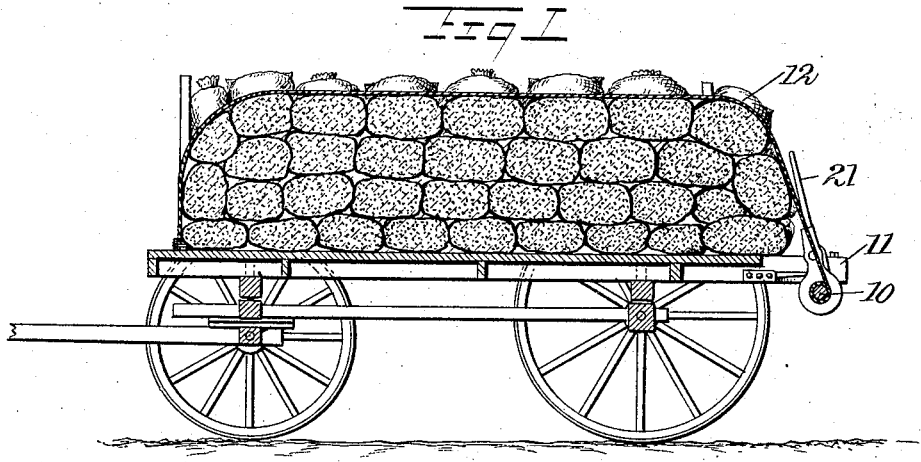
Figure 2:
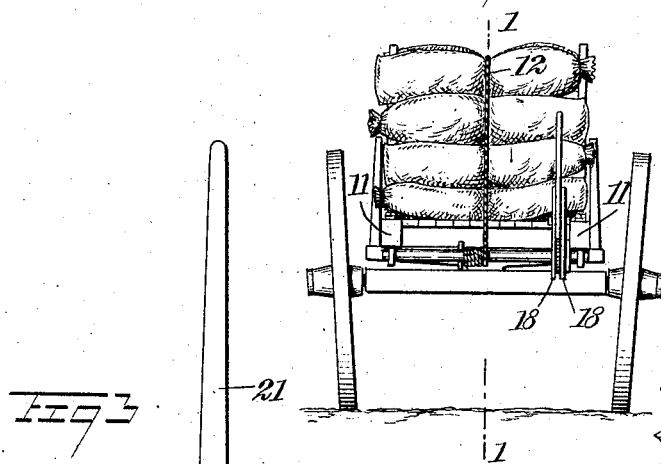
Figure 3:
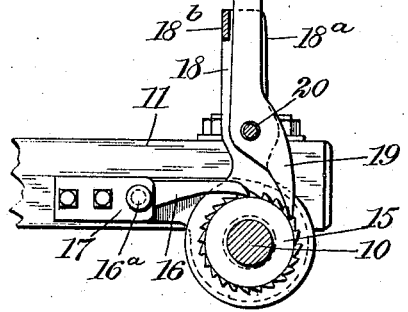
Figure 4:
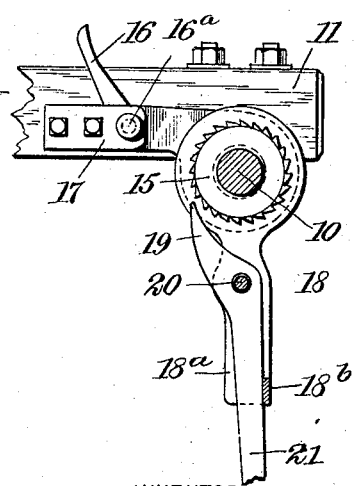

Figure 1 is a longitudinal section of a wagon equipped with a device used as means for securing the wagon-load in place, the section being taken on the line 1 1 of Fig. 2. Fig. 2 is a rear elevation of the same. Fig. 3 is an enlarged section showing the pawl, ratchet, and dog in active position. Fig. 4 is a similar view showing these parts in inactive position.

In Fig. 1 the roller 10 is revolubly mounted, by any suitable means, under the sills 11 of the wagon or in any other convenient or desired place, preferably at the rear thereof. 12 indicates a rope, chain, cable, or the like which, as here shown, is attached to the front end of the wagon and carried rearward and around the roller 10, so that by operating the roller the chain or cable 12 may be tightened or loosened at will.

Referring particularly to Figs. 3 and 4, 15 indicates a ratchet suitably fastened to one end portion of the roller 10. Coacting with this ratchet is a dog 16, connected by any suitable fixture 17 with one of the sills 11 of the wagon-body. This dog is pivoted at the point $16^a$ and may be thrown from the active position shown in Fig. 3 to the inactive position shown in Fig. 4. Said dog is used in connection with the form of invention shown in Fig. 1 and is used to prevent the return movement of the roller when the rope 12 is under pressure. To slacken the rope 12, it is only necessary to throw up the dog 16, causing it to disengage the ratchet, and then the roller will be free to revolve. Mounted loosely on the roller 10 at each side of the ratchet 15 are two plates 18, having extensions $18^a$, joined by a transverse connecting-piece $18^b$, these parts 18, $18^a$, and $18^b$ constituting a sort of frame, which is free to swing around the roller 10 from the position shown in Fig. 3 to that shown in Fig. 4. A pawl 19 is pivoted to the said plates 18 on a transverse pin 20, which extends between the plates. Said pawl has a relatively long arm 21, forming a handle for operating the pawl. It will be observed that when the arm 21 is raised, as in Fig. 3, and pressure applied to swing said arm rightward and downward the pawl 19 will engage the ratchet and, through the medium thereof, turn the roller 10. Upon the return movement of the arm 21 said arm will strike the cross-piece $18^b$, and the pawl will move out of engagement with the ratchet, as Fig. 4 shows. This allows a return of the pawl and its arm 21 to the starting position (shown in Fig. 3) without a contacting of the pawl with the teeth of the ratchet. When this return has been effected, the downward movement of the arm 21 should be repeated, and in this manner the roller may be rotated.

Various changes in the form, proportions, and minor details of my invention may be resorted to at will without departing from the spirit and scope thereof. Hence I consider myself entitled to all such variations as may lie within the intent of my claim.

Having thus described my invention, I claim as new and desire to secure by Letters Patent—

The combination of a ratchet, a frame arranged to swing around the axis thereof, said frame being formed of two parallel plates spaced apart from each other, and provided with a circular portion at the end of the frame through which the axis of the ratchet passes, said circular portion being of larger diameter than said ratchet to project outwardly past the teeth of the ratchet, said plates having a transverse connecting portion at their outer ends at one side thereof, and an intermediately-pivoted lever mounted between said plates, the shorter end of said lever lying between the sides of the circular portion at the inner end of said frame and forming a pawl to engage the ratchet, and the other end being extended between and beyond said parallel plates to form an operating-arm, said arm being adapted to engage said transverse connecting member when moved sufficiently rearward to swing the pawl out of engagement with the ratchet, whereby to move said frame rearwardly with the rearward movement of the operating-arm.

In testimony whereof I have signed my name to this specification in the presence of two subscribing witnesses.

HENRY WILLIAM KOEHLER.

Witnesses:
J. C. HAINES,
F. L. MINTIE.